United States Patent [19]

Tomkins

[11] Patent Number: 5,277,958
[45] Date of Patent: Jan. 11, 1994

[54] MULTIPLE-LAYER STRUCTURES AND JOINING METHOD FOR HONEYCOMB, FOAM AND LIGHTWEIGHT MATERIALS

[76] Inventor: Keith A. Tomkins, 31223 Oakmont Ave., Sorrento, Fla. 32776

[21] Appl. No.: 459,981

[22] Filed: Jan. 2, 1990

[51] Int. Cl.⁵ .......................................... B32B 3/12
[52] U.S. Cl. ........................................ 428/116; 52/84; 52/806; 244/123; 428/71
[58] Field of Search ............... 428/117, 71, 73, 116, 428/117, 118; 52/84, 272, 309.9, 785, 806; 244/123

[56] References Cited

U.S. PATENT DOCUMENTS

| | | | |
|---|---|---|---|
| 2,870,857 | 1/1959 | Goldstein | 428/116 X |
| 3,282,015 | 11/1966 | Rohe et al. | 411/258 X |
| 3,771,748 | 11/1973 | Jones | 428/116 X |
| 3,775,526 | 11/1973 | Gilmore | 428/116 X |
| 3,902,732 | 9/1975 | Fosha, Jr. et al. | 428/116 X |
| 4,052,202 | 10/1977 | Luyckx | 75/567 X |
| 4,136,222 | 1/1979 | Jonnes | 428/116 |
| 4,370,372 | 1/1983 | Higgins et al. | 428/117 X |
| 4,395,450 | 7/1983 | Whitener | 244/123 X |
| 4,416,349 | 11/1983 | Jacobs | 52/807 X |
| 4,662,587 | 5/1987 | Whitener | 428/116 X |
| 4,671,470 | 6/1987 | Jonas | 428/116 X |

Primary Examiner—Henry F. Epstein
Attorney, Agent, or Firm—James H. Beusse

[57] ABSTRACT

Multiple layers of honeycomb or foam core lightweight materials are bonded together side-by-side to increase strength, to customize strength relationships in relation to form for particular structural components and to provide a base for strong connections to honeycomb and foam structures. Increased strength results from utilizing outside layers as skins for some embodiments with an effect of progressive increase of strength of the core with the multiple layers. Connection strength is provided by formation of connection bays in one or more outside layers to which connection members of structural components are bonded in the connection bays. The outside or distal core layers can be higher density and higher strength than inside core layers for dynamic and impact-related use-conditions in addition to providing a thicker and stronger surface to which other structures and other members can be connected. An aircraft wing constructed using this method illustrates high-density, high-heat and high-impact strength of a contoured distal core in relationship to a low-density contoured proximal core.

4 Claims, 2 Drawing Sheets

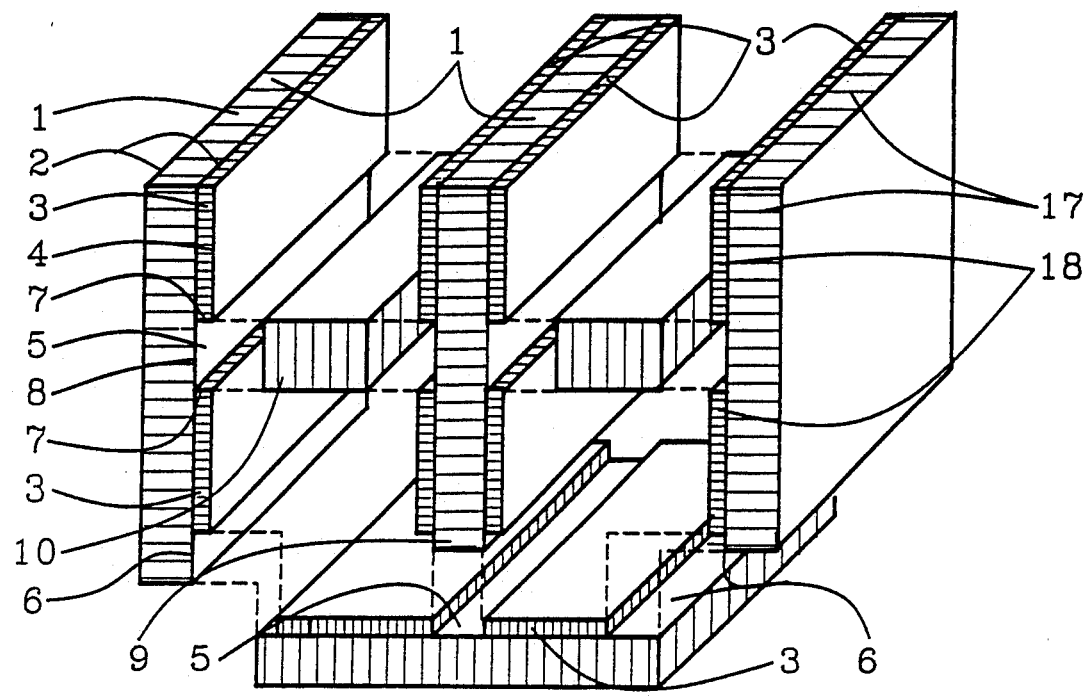
FIG. 1
FIG. 2
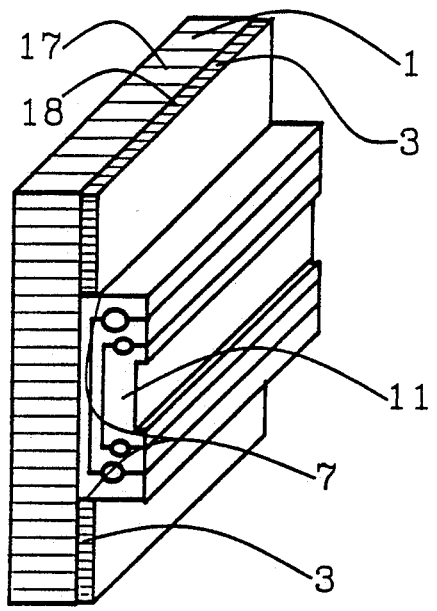
FIG. 3
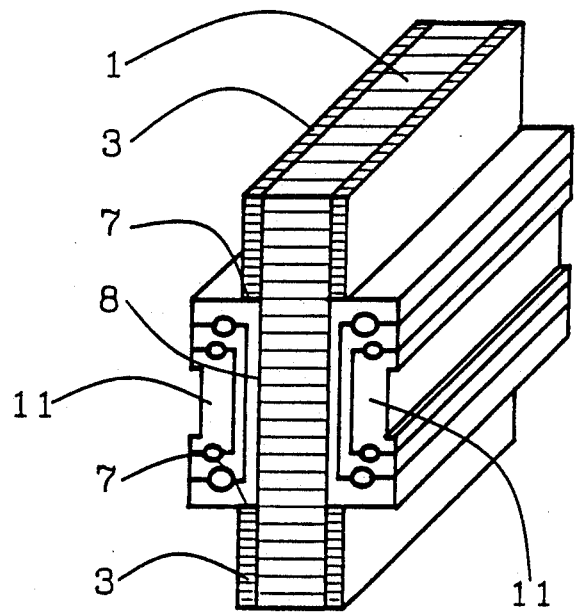

MULTIPLE-LAYER STRUCTURES AND JOINING METHOD FOR HONEYCOMB, FOAM AND LIGHTWEIGHT MATERIALS

BACKGROUND OF THE INVENTION

This invention relates to lightweight structural members and more particularly to multiple layers of honeycomb, foam or similar lightweight material members bonded together for increased structural strength and improved bonding strength.

Structural uses of honeycomb and foam construction have been confined previously to single layers. Increased advantages of strength-per-weight, torsional strength, joining strength, impact strength and other advantages related to particular products, however, can be achieved with multiple layers of bonded honeycomb members. The aerospace industry is the most prolific user of honeycomb construction. There its often greater cost is compensated by essential strength-per-weight. Prior use of multiple honeycomb layers have been only at joints to join single honeycomb layers to other single layers or to other structural members of aircraft. The use of multiple layers for increased structural strength in addition to increased joining strength and decreased construction cost has not been recognized nor developed. U.S. patents describing joining methods with variations of multiple layers of honeycomb material include U.S. Pat. No. 4,671,470 granted to Jonas in June 1987; U.S. Pat. No. 4,395,450 granted to Whitener in July 1983; and U.S. Pat. No. 4,416,349 granted to Jacobs in November 1983. None of these employed multiple layers except to a limited extent at joints. They did not provide the strength of multiple layers throughout the structure and at the joints.

Other methods of joining honeycomb members have included variations of potted bolts such as described in U.S. Pat. No. 4,370,372 granted to Higgins in 1983; U.S. Pat. No. 4,052,202 granted to Fischer & Fischer in 1977; and U.S. Pat. No. 3,282,015 granted to Rohe et al. in 1966. Like the multiple layers only at joints, the potting methods provide only local strength and resulted in decrease of overall strength per weight.

SUMMARY OF THE INVENTION

One object of this invention is to increase strength-per-weight of honeycomb construction.

Another object is to decrease cost by decreasing costs of connections for honeycomb construction.

Another object is to increase the uses of honeycomb construction by providing higher dynamic-use strength and higher connection strength.

Another object is to increase the uses of honeycomb construction.

Particular objects are to provide improved aircraft frame construction, aircraft wing construction, aircraft cabinetry, general cabinetry, prefabrication of built-in dwelling cabinetry and general cabinetry.

Multiple layers of honeycomb cores are bonded together side-by-side to increase strength, to customize strength relationships in relation to form for particular structural components and to provide a base for strong connections to honeycomb structures. Increased strength results from utilizing outside layers as skins for some embodiments with an effect of progressive increase of strength of honeycomb core with the multiple layers. Connection strength is provided by formation of connection bays in one or more outside layers to which connection members of structural components are bonded in the connection bays. The outside or distal honeycomb core layers can be higher density and higher strength than inside core layers for dynamic and impact-related use-conditions in addition to providing a thicker and stronger surface to which other structures and other honeycomb members can be connected.

BRIEF DESCRIPTION OF THE DRAWINGS

This invention is described by claims in relation to a description of preferred embodiments illustrated in the following drawings in which:

FIG. 1 is a perspective view of representative embodiments;

FIG. 2 is a perspective view of a two-layer honeycomb panel with a drawer-holding assembly attached at one side;

FIG. 3 is a perspective view of a three-layer honeycomb panel with a drawer-holding assembly attached at both sides;

DESCRIPTION OF THE PREFERRED EMBODIMENTS

Figure 4:
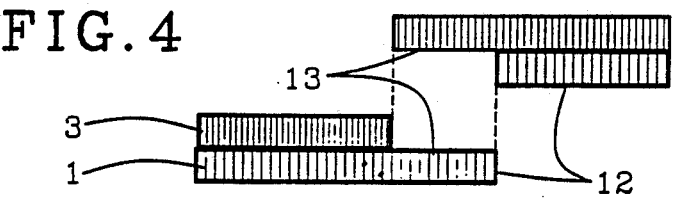
FIG. 4 is a side view of spliced-panel-connection embodiment.

Referring to FIG. 1 and to all FIGS. generally, a proximal honeycomb core 1 is bonded at opposite sides to proximal core skin 2. A distal core 3 is bonded at opposite sides to distal core skin 4. At least one distal core 3 with distal skins 4 is bonded to either or both proximal core skins 2. Either a proximal core skin 2 or a distal core skin 4 can be utilized as a common skin between bonded proximal cores 1 and distal cores 3. The distal cores 3 and skins 4 function, in effect, as outer skins to the proximal core 1. They form an exoskeleton construction for providing increased beam-type strength, for attachment of appendages of connecting structures and for interface with use-conditions. The workloads of the proximal cores 1 can be greatly different from the workloads of the distal cores 3 and both the cores 1 and 3 and the skins 2 and 4 can be designed appropriately different accordingly.

Figure 5:
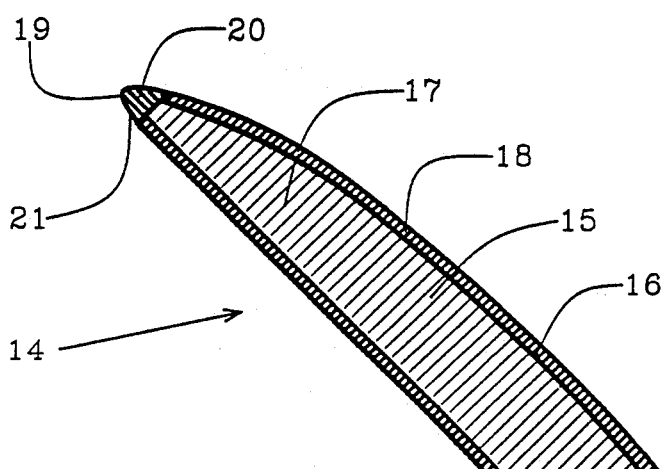
FIG. 5 is a cross section of a portion of an airplane wing demonstrating aircraft structural and contoured applications of this honeycomb construction.

Referring to all FIGS. except FIG. 5, connection bays in any form such as a channel connection bay 5 or an angle connection bay 6 can be provided at distal-core channel walls 7 with bay floors 8 at preferably an outside surface of proximal skin 2 or, alternatively for some purposes, at an inside surface of distal skin 3. Structural connection members 9 comprising either other honeycomb members such as shelves or shelf-like forms 10 or other materials can be sized and shaped to fit snugly into the connection bays 5 and 6 and to be bonded there with appropriate bonding agents and bonding procedures.

Referring to FIGS. 2 and 3, other non-honeycomb components such as a drawer-slide assembly 11 can be utilized in this honeycomb construction. Drawers provide particularly severe dynamic use-conditions for conventional honeycomb construction of cabinetry. But with the exoskeleton construction and connection strength provided by this invention, more demanding use conditions can be designed for with honeycomb construction. This is a particular advantage for cabinetry for aerospace vehicles, cars, motor homes, boats, prefabricated homes and trailer homes. For all cabinetry, it provides particularly sturdy and now long-lasting construction under typical use-conditions. FIG. 2 illustrates a single-sided attachment and FIG. 3 a double-sided attachment construction.

Referring to FIG. 4, a spliced panel 12 with a mirror-image fitting 13 of another structural member or spliced panel can form a connection bay and connection member. This is a form of an angle connection bay.

Referring to FIG. 5, a section of an airplane wing 14 with a contoured inside core 15, also referred to as a proximal core, and matching outside contoured core 16, also referred to as a distal core, demonstrate construction with proximal and distal honeycomb layers for curved or compound-curved forms similar to that shown in FIG. 4. To form such a curved wing, one or more proximal layers 15 is sized and shaped to a design by selectively cutting or constructing proximal core walls 17 in lengths that form the design structure at their terminal ends with the wall 17 at right angles to bending and torsional strength requirements of the design structure. Then distal core walls 19 also are cut or constructed with lengths that shape core surfaces to the contour of the proximal core with the distal core walls 18 extended generally at right angles to the direction of bending and torsional strength requirements of the structure. At positions on curves and bends, distal cores 16 with appropriately-angled distal core walls 18 can be positioned at right angles to the direction of strength requirements for maximizing structural integrity. To accomplish this, some sections may require distal cores 16 with distal core walls 18 at varying angles from the proximal core walls 17. This would require wedges or wedge-shaped core walls. However, in the case of the airplane wing 14 with near-parallel walls and an acutely-curved leading edge 19, the leading edge 19 could be provided with leading-edge core walls 20 at right angles to distal core walls 18.

The leading-edge core walls 20 and a leading-edge core skin 21 could be constructed of appropriately heat-resistant and impact-strength materials. Differences in materials for proximal cores 15 and distal cores 16 are illustrated by different thicknesses of lines representing the respective core walls 17 and 18. The distal core walls 18 could be appropriately higher in density thicker for particular applications than proximal core walls 17.

Similar design characteristics and principles could be employed for a nose cone or for other sections of aerospace-vehicle construction. An airplane wing or nose cone could be constructed without either ribs, stringers or struts for many low-cost but highly reliable executive and private aircraft. To a great extent, the same principles could be employed effectively for frame and wing construction as well as for cabinetry construction of commercial aerospace vehicles also.

Figure 6:
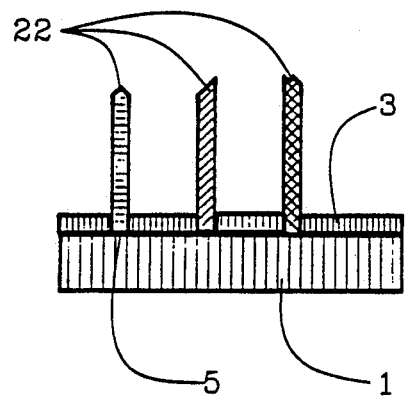
FIG. 6 is an end view of divider connections with this invention.

FIG. 6 illustrates a distal core 3 with dividers, walls or shelves 22 connected in channel connection bays 5. The dividers, walls or shelves 22 can be honeycombed or constructed of different materials as indicated by the different material cross sections.

Figure 7:
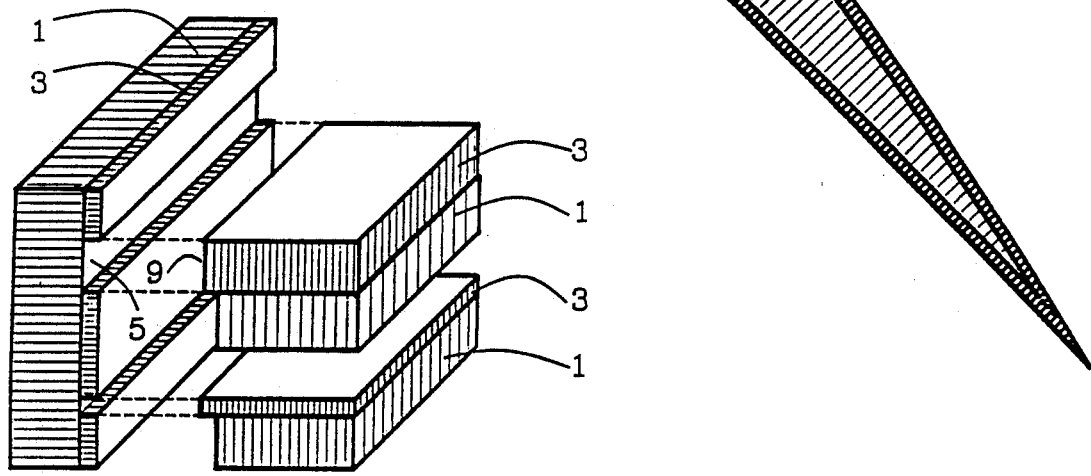
FIG. 7 is a perspective view of additional structural and connection features.

FIG. 7 illustrates variation of thickness relationships of proximal cores 1 and distal cores 3 in relationship to channel connections bays 5 and angle connection bays 6 for different applications.

Although the preferred embodiments of the present invention have been described using honeycomb materials, it can also be applied to other lightweight materials, particularly foam core, to increase strength of structural members made therefrom.

It will be apparent to one skilled in the art that a new and useful honeycomb construction and methods for use have been described hereinabove and that various modifications from the specific details are contemplated to fall within the following

I claim:

1. A structure comprising:
    a set of generally flat panels, at least one of said panels including a plurality of honeycomb cores interposed between and bonded to a plurality of core skins, respectively, with a pair of said core skins on a pair of said honeycomb cores defining a pair of generally opposite faces on said each panel;
    said at least one of said panels further including a slot defined by a pair of generally opposite sidewalls extending through one of said opposite faces and at least one of said honeycomb cores adjacent said one opposite face, and a part of another of said core skins between said at least one honeycomb core and another of said honeycomb cores adjacent thereto defining a base wall of said slot extending between said opposite side walls, at least another of said panels arranged in an assembly position with said at least one panel with said at least another panel, said at least another panel including at least another honeycomb core contained between at least a pair of other core skins, and a marginal edge interposed between said other core skins, at least a part of said marginal edge being disposed n said slot at least adjacent said base wall and a part of said other core skins being disposed in said slot at least adjacent said opposite sidewalls, respectively; and
    adhesive means disposed at least in part in said slot for securing said at least one panel and said at least another panel against displacement from their assembly position.

2. The structure of claim 1 wherein said at least one of said honeycomb cores is substantially less thick than said another of said honeycomb cores.

3. The structure of claim 2 and including a third honeycomb core layer adhesively bonded to another of said generally opposite faces on said at least one of said panels to form a panel having three honeycomb core layers, said third honeycomb core layer including another core skin overlaying an exposed side thereof opposite said another of said generally opposite faces on said at least one of said panels.

4. A structure comprising:
    a set of generally flat panels, at least one of said panels including a plurality of foam cores interposed between and bonded to a plurality of core skins, respectively, with a pair of said core skins on a pair of said foam cores defining a pair of generally opposite faces on said each panel;
    said at least one of said panels further including a slot defined by a pair of generally opposite sidewalls extending through one of said opposite faces and at least one of said foam cores adjacent said one opposite face, and a part of another of said core skins between said at least one foam core and another of said foam cores adjacent thereto defining a base wall of said slot extending between said opposite side walls, at least another of said panels arranged in an assembly position with said at least one panel with said at least another panel, said at least another panel including at least another foam core contained between at least a pair of other core skins, and a marginal edge interposed between said other core skins, at least a part of said marginal edge being disposed in said slot at least adjacent said base wall and a part of said other core skins being disposed in said slot at least adjacent said opposite sidewalls, respectively; and adhesive means disposed at least in part in said slot for securing said at least one panel and said at least another panel against displacement from their assembly position.

\* \* \* \* \*